350-269.    SR

XR    3,577,101

[11] 3,577,101

[72] Inventor Lotar Pege
Bad Schwalbach, Zur Hardt, Germany
[21] Appl. No. 769,473
[22] Filed Oct. 16, 1968
[45] Patented May 4, 1971
[73] Assignee Firma Forschungslaboratorium, Prof. Dr. Ing. W. Heimann
[32] Priority Oct. 20, 1967
[33] Germany
[31] P 15 89 795.7

[54] ELECTROMECHANICAL TORSIONAL OSCILLATOR
9 Claims, 6 Drawing Figs.

[52] U.S. Cl. .......... 331/154, 318/132, 331/156, 335/87, 350/6,269
[51] Int. Cl. .......... G02f 1/34, H03b 5/30
[50] Field of Search .......... 331/116 (M), 154, 156; 58/28, 131; 310/25, 29, 32, 36; 318/129, 132; 335/87, 90, 91, 93, 94; 350/6, 269, 270

[56] References Cited
UNITED STATES PATENTS
3,277,394 10/1966 Holt et al. .......... 331/116(M)

*Primary Examiner*—Roy Lake
*Assistant Examiner*—Siegfried H. Grimm
*Attorney*—Otto John Munz

ABSTRACT: An electromechanical torsional oscillator for the modulation of devices for measuring electromagnetic radiation frequencies, the oscillator including a mechanical vibrator device with two opposing cylindrical plugs linked to one another by a plurality of double-cantilever-type leaf springs attached by their ends alternately to one or the other plug, so as to give the plugs only a single (rotational) degree of freedom relative to one another. The device further includes electromagnetic driving means to maintain an oscillating motion which, in an exemplary application, is used to vibrate the shading shutter of a radiation-modulating-type temperature-measuring apparatus. Means are provided to adjust the resonant frequency.

INVENTOR
LOTAR PEGE
BY Otto John Munz
ATTORNEY

INVENTOR
LOTAR PEGE
BY Otto John Munz
ATTORNEY

INVENTOR
LOTAR PEGE

BY Otto John Munz
ATTORNEY

ELECTROMECHANICAL TORSIONAL OSCILLATOR

BACKGROUND OF THE INVENTION

1. Field of the Invention

The invention relates to an electromechanical oscillator comprising a torsional vibrator which operates independently of its position, is self-exciting and serves for the mechanical modulation of an electromagnetic radiation measuring device.

2. Description of the Prior Art

The prior art employs devices for measurements of radiations, such as temperature-measuring devices, which are modulated mechanically, are fed from electric batteries and utilize bending or rotating vibrators in view of the required high constancy of frequency of the modulators and the low current demand. When it is necessary that the zero position of the shading shutter is position independent, a torsional vibrator is particularly suitable because its center of gravity may be repositioned into the rotational axis simply and therefore no position-dependant torsional movements can be caused.

Torsional vibrators were therefore suggested employing a torsion rod mounted on both sides and carrying shading shutters. This embodiment has the shortcoming that the mounting of the torsion rod must be symmetrical relative to the shading shutter and that therefore two mounting positions are necessary. This requires a considerable amount of space for the torsional vibrator.

SUMMARY OF THE INVENTION

A object of the invention is to improve upon the prior art devices and to produce an improved mechanical-electrical oscillator or comprising an improved vibrator of the kind described, which requires a minimum space in an installation, is easier to assemble in a single mounting position and unaffected by the relative positions of the oscillator and of the shading shutter and can be easily preset and tuned.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
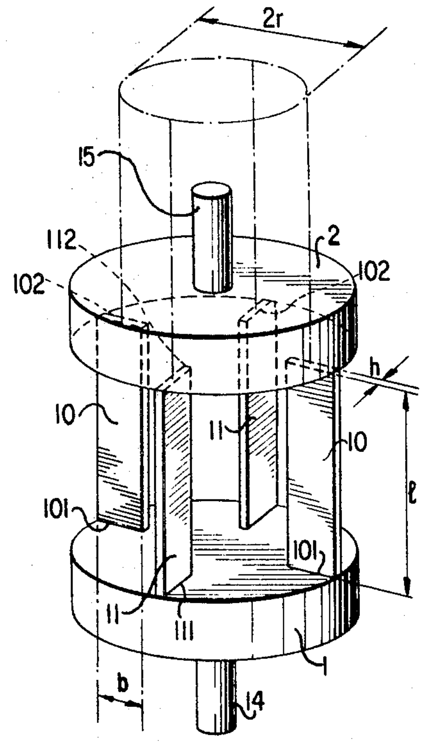
FIG. 1 is a perspective view of an embodiment of the vibrator element in accordance with the invention.
Figure 2:
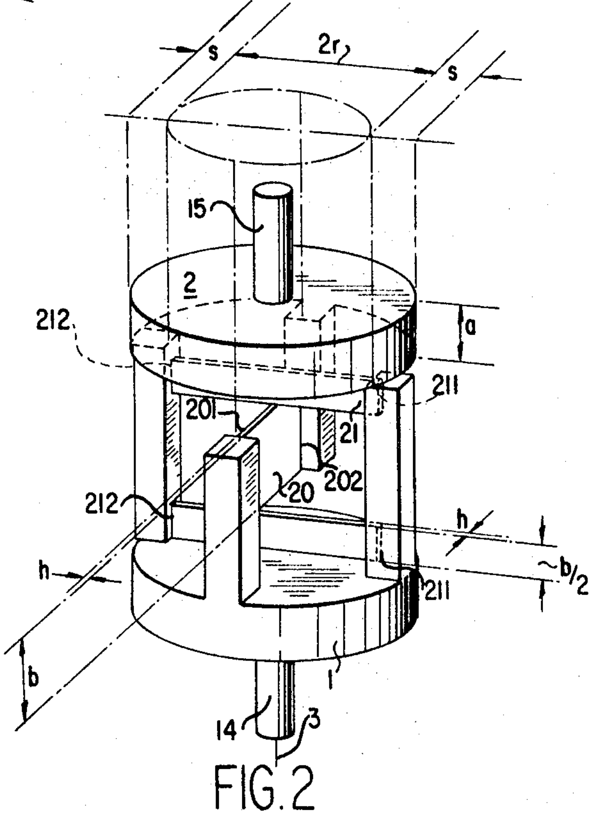
FIG. 2 is a perspective of another embodiment of the vibrator element in accordance with the invention.
Figure 4:
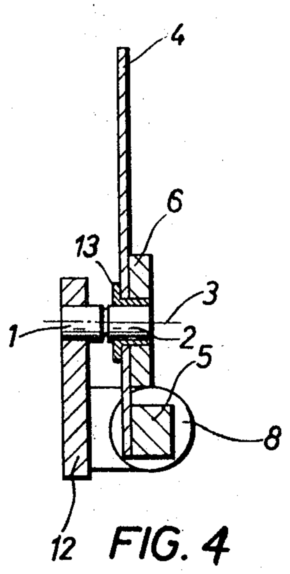
FIG. 4 is a cross-sectional view of the embodiment of the oscillator as it is diagrammatically represented in FIG. 3.

Referring now to the drawings, wherein like reference characters describe like or corresponding parts throughout the several views, there are shown in FIGS. 1 and 2 which illustrate preferred embodiments of the invention, two cylindrical vibrators having various parts and properties in common. Two cylindrical mounting plugs 1 and 2 of the same diameter are shown mounted coaxially spaced from each other with their planes in parallel and interconnected with each other by a plurality of symmetrically spaced leaf springs, tines or reeds 10 of oblong shapes and attached to these springs at their edges. The plug 1 is shown in FIG. 4 mounted on the inside of the oscillator device and will be referred to therefore for claim purposes as the inner plug, and plug 3 as the outer plug.

In FIG. 1 the leaf springs are mounted radially, whereas in FIG. 2 they are mounted axially.

On the outer sides of each plug is attached an outwardly protruding shaft 14 and 15 respectively, each in alignment with the common imaginary axis 3 of the plugs.

The leaf springs in FIG. 1 are shown radially mounted in two pairs, 10, 10 and 11, 11 respectively, The leaf springs of each pair mounted opposite to each other, each spring of each pair in the same plane, cutting the imaginary axis, the planes of each pair of springs at angles to each other. The springs are symmetrically spaced from each other. The leaf springs 10 and 11 are mounted radially with their edges 101 and 111, respectively, to the inner plug, and with their edges 102 and 112, respectively, to the outer plug. Thus, the leaf springs are capable of elastically changing their shape only in response to components of force acting in a direction perpendicular to the planes of the springs. Since the two pairs of springs have only one common axis, the plugs may be moved relative to each other only by forces which are directed tangentially to the circumference of the plugs. Bending momentum perpendicular to the axis 3 is opposed by a high moment of inertia which is substantially determined by the distance between the leaf springs from the axis. Such force in practice in the present invention cannot cause any bending deformation of the rotational axis. The material of the springs is selected to perform at a predetermined desired spring constant.

In FIG. 2 the leaf springs 20 and 21 are mounted parallel to the axis 3. They are connected to the plug 1 with edges 201 and 211 and to the plug 2 with edges 202 and 212. The leaf springs 10, 11, 20 and 21 form at least two planes which preferably intersect with each other at the axis 3. It will be obvious to those skilled in the art that both embodiments of the invention, the radial and the axial each may have the leaf springs arranged in such a manner that they form more than two planes intersecting at axis 3, without departing from the spirit and scope of the invention.

Figure 3:
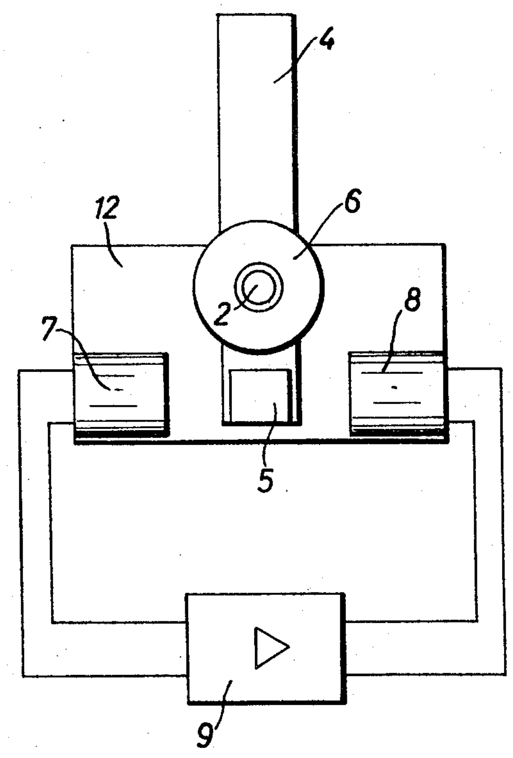
FIG. 3 is a diagrammatic view of the device of the invention in combination with the vibrator element of either FIGS. 1 or 2.

In FIGS. 3 and 4 the complete oscillator assembly of the vibrator of either embodiment is shown with other major parts of the device in accordance with the invention.

The vibrator is mounted inside the hollow inner plug 1 which is held by a mounting plate 12. The shaft of the outer plug is surrounded by sleeve 13 on which is mounted in succession toward the outside a shading shutter 4 and an inertia tuning disc 6. The shading shutter has two arms, a long one in the drawing shown pointing upwards, and a shorter arm opposite therefrom with a permanent magnet 5 attached to the bottom thereof. Spaced from the magnet at one side thereof is a pickup coil 7. The permanent magnet induces electric current in the pickup coil with any minute vibration of the device such as is always present. The pickup coil is connected to amplifier 9. The amplified current actuates the driving coil 8, which swings the permanent magnet out to pivot the shading shutter 4 relative to axis 3. The inertia tuning disc 6 which increases the mass moment of inertia codetermines the resonance frequency of the vibrator by its mass. The frequency of the device is determined by the mechanical resonance frequency of the vibrator, that is, by the relation between the spring constant of the leaf springs to the combined mass of the magnet and of the tuning disc. The frequency of the device can be controlled therefore by the mass of the tuning disc. Since the leaf spring does not possess any degree of freedom perpendicular to the axis, only torsional vibrations may occur.

The inventive solution offers the advantage that the leaf springs do not have to be reset or retuned—although normally they are very much strained by high load changes. The center of gravity in the axis does not change, and therefore the device remains unaffected by its position.

Figures 5, 6:
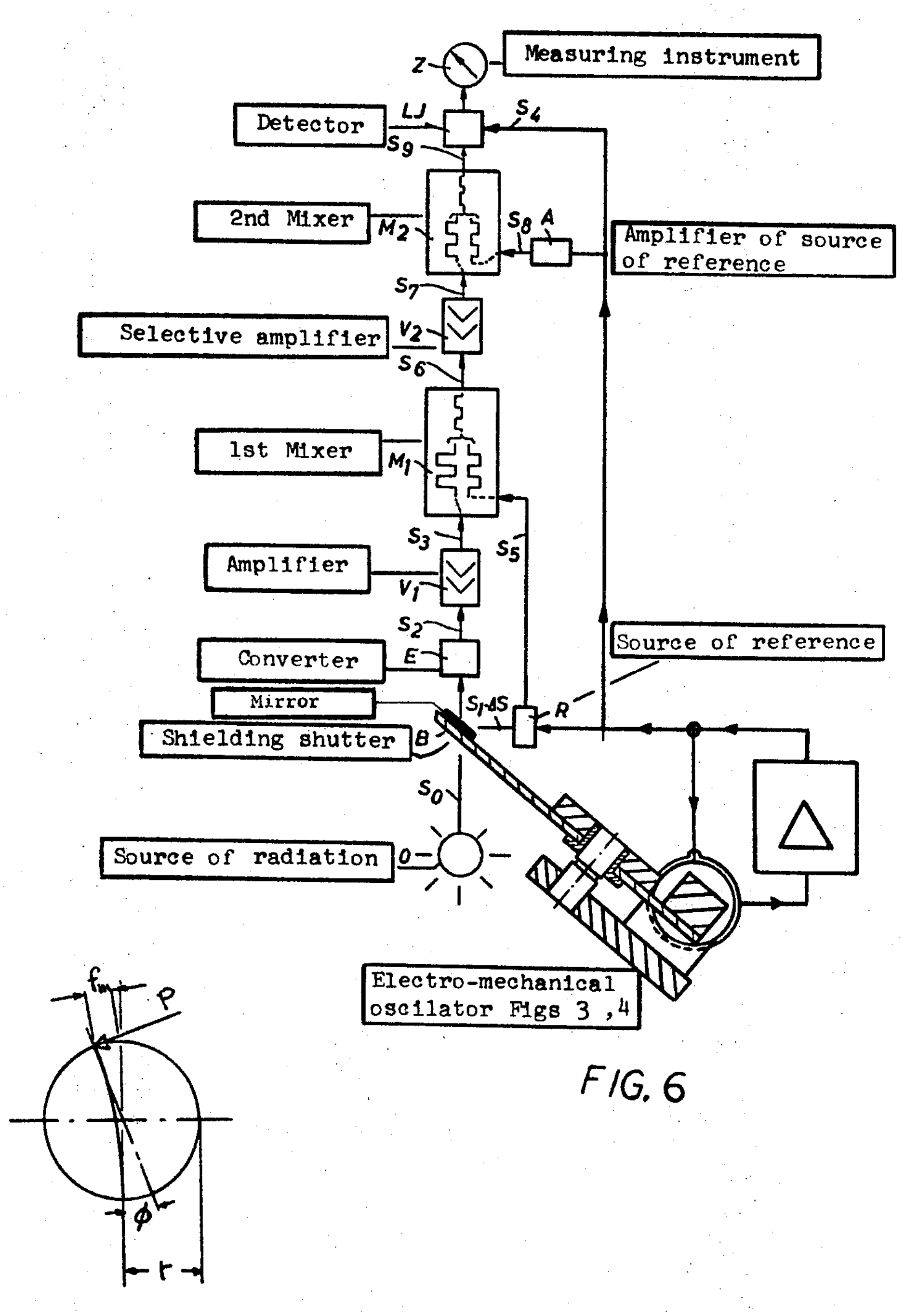
FIG. 5 indicates diagrammatically the spring action of the vibrator element of FIG. 2.
FIG. 6 shows an arrangement of a complete radiation measuring circuit embodying as part thereof the device of the invention.

In accordance with FIG. 2 the vibrator fixed with the inner plug produces rotational movements on the outer plug by changing its angle $\Phi$ as shown in FIG. 5, the spring constant being determined in accordance with the following equation (I) in kp. cm./rad.:

$$C=\frac{M}{\phi}=\frac{P\cdot r}{\phi}$$

$$\phi=\frac{fm}{r}$$

$$C=\frac{P\cdot r}{fm}\cdot r$$

$$fm=\frac{P\cdot(2r)^3}{3EI}=\frac{P\cdot 8r^3}{3EI}$$

$$P=\frac{3EI\cdot fm}{8\cdot r^3}$$

$$C=\frac{3E\cdot I\cdot fm}{8r^3}\cdot\frac{r^2}{fm}=\frac{3\cdot E\cdot I}{8r}$$

$$\text{(I)}\qquad C=\frac{3}{8}\cdot\frac{E\cdot I}{r}\neq\left[\frac{\text{kp. cm.}}{\text{rad}}\right]$$

Equation (I) applies for one leaf spring. When a plurality of leaf springs is employed $C_{total}=C_1+C_2+\ldots..C_n$ E = the modulus of elasticity in kp./cm.$^2$ I = The polar moment of inertia of the spring in cm/$^4$ $r$ = ½ of the free spring length The frequency for the vibrator of FIG. 2 (in Hz.) and the relation between the resonance frequency and the construction details of the oscillator are determined by the following equation:

$$\text{(II)}\qquad f=\frac{1}{2\pi}\sqrt{\frac{C_{\text{tot}}}{Id_{\text{tot}}}}=\frac{1}{2\pi}\sqrt{\frac{C_{\text{tot}}}{Id_{4,5}+Id_6}}$$

the suffixes 4 and 5 representing the vibrator parts and 6 the tuning disc. $C_{tot}$ is the overall spring constant, obtained as described above, in kp. cm./rad. (a kilopond being the unit force acting on a mass of 1 kg. under the gravitational acceleration of $g.=9.81$ m./sec.$^2$), and $Id_{tot}$ represents the total mass moment of inertia of the moving parts. With a complete modulator, the vibrating plate, the magnet and the tuning disc must be included into the calculation.

The frequency of the vibrator is computed for a frequency which is about 1 Hz. above the nominal frequency. The mass moment of inertia $Id_{tot}$ is increased and the frequency is decreased in accordance with equation (II) by the above addition of a thin tuning disc on the gravitational axis of the movable portion of the vibrator.

Preferably tuning discs are employed, which have an identical radius to facilitate the arithmetical computations of their thicknesses $\delta$ in relation to the respective frequency changes $\Delta f$. For small frequency changes in the neighborhood of the nominal frequency, where only a minor additional moment of inertia $\Delta$ I$d$ is required, $\Delta f$ changes approximately linearly with $\Delta$ I$d$. Thus for practical purposes the tuning discs may be calculated so that a tuning disc having a thickness $\delta$=0.1 mm. in the neighborhood of the desired frequency effects a change $\Delta f$=0.1 Hz., (when $\delta$=0.2, $\Delta f$=0.2 Hz. etc.

A general theoretical equation for the spring constant of an element constructed in accordance with FIG. 2 is expressed as follows:

$$b_1=b_2=\frac{b_3}{2}$$

$$h_1=h_2=h_3=h$$

$$I=b\cdot\frac{h^3}{12}=\frac{h^3}{12}\cdot\Sigma(b)$$

$$I=\frac{h^3}{12}\left(b+2\cdot\frac{b}{2}\right)=b\cdot\frac{h^3}{\phi 6}$$

Inserted in equation (I)

$$C=3/8\cdot\frac{E\cdot b\cdot h^3}{6\cdot r}=\frac{3}{48}\cdot\frac{E\cdot b\cdot h^3}{r}\left[\frac{\text{kp.cm.}}{\text{rad}}\right]$$

When steel springs are employed with a modular of elasticity of $E=2.1\cdot 10^6 kp/cm^2$, one obtains $$\text{(III)}\qquad C=1.31\cdot 10^5\cdot\frac{b\cdot h^3}{r}\left[\frac{\text{kp.cm.}}{\text{rad}}\right]$$

($b$, $h$, $r$ being in cm.)

A comparison between the leaf springs of the present invention mounted in accordance with FIGS. 1 and 2 with a steel wire having the same spring constant results in the following equations:

In accordance with equation (III), the equation for the spring of FIG. 1 is:

$$C=1.31\cdot 10^5\cdot\frac{b\cdot h^3}{r}\left[\frac{\text{kp.cm.}}{\text{rad}}\right]$$

$b$=0.5 cm.
$h$=0.01 cm.
$r$=0.3 cm.

$$C=1.31\cdot 10^5\cdot\frac{0.5\cdot(0.01)^3}{0.3}=0.218\left[\frac{\text{kp.cm.}}{\text{rad}}\right]$$

This will give the following approximate dimensions:

Diameter $d 2r+2s$=0.3+2·0.1; $s$ being 0.1

Hence $d$=0.8 cm.

Length $l$=2$b$+2$a$=2·0.5+2·0.15; $a$ being 0.15

Hence $l$=1.3 cm.

In comparison thereto, for a round profile (piano wire), the following would obtain:

$$C=\frac{\pi d^4}{32l}\cdot G$$

$G$, for steel being 800,00 kp./cm$^2$.

Therefore:

$$C=\frac{\pi d^4}{32l}\cdot 800000\,\frac{\pi d^4}{4l}\cdot 10^5\left[\frac{\text{kp.cm.}}{\text{rad}}\right]$$

In order to obtain the same spring constant with the piano wire of $l$=1.3 cm., held in cantilever attachment on one end, it would have to have the following diameter:

$$d=\sqrt[4]{\frac{4\cdot l\cdot C}{10^5\pi}}=\sqrt[4]{\frac{4\cdot 1.3\cdot 0.218}{10^5\pi}}$$

hence $d$=0.044 cm.

In FIG. 6 the oscillator of the present invention is illustrated in combination with a conventional radiation measuring circuit solely for the purpose of providing an example of the usefulness of the invention and no limitation of the invention to a combination with such a circuit is intended.

The radiation measuring circuit shown in FIG. 6 substitutes for the vibrator-oscillator device of the prior art which is shown and described in detail in applicant's French Pat. No. 1,441,917, applied July 15, 1965, the vibrator oscillator device of the present invention.

While the springs in FIGS. 1 and 2 are shown mounted relative to the said plugs perpendicularly other angular relations are feasible within the scope of the invention.

While only one tuning disc has been shown, a plurality of such discs may be employed to better control the mass thereof.

The elongated arm of the shading shutter may for instance be superimposed over a scale for visual readings or provided with a recording stylus superimposed over a moving tape for continuous recording. It may function as a circuit making or breaking switch contact or as a mechanical lever and in other capacities.

The drawings of FIGS. 1, 2, and 4 are to scale.

Obviously many modifications, variations and improvements of the present invention are possible in the light of the above disclosure. It is therefore to be understood, that within the scope of the appended claims, the invention may be practiced otherwise than as here specifically described.

I claim:

1. A torsional vibrator device for the creation of a constant-frequency rotary oscillation comprising in combination:

a stationary inner mounting plug;

an outer mounting plug in a parallel, spaced relationship thereto, and a plurality of flexible oblong reeds fixedly connected with their respective ends to said inner and outer mounting plugs, said reeds being equidistantly spaced from each other around an imaginary central axis, the profiles of said reeds being oriented so that a forcible rotational displacement of the outer plug around said imaginary axis causes bending of all the reeds around the axis of their lowest moment of inertia, thus giving the outer plug a single rotational degree of freedom, said reeds thus being capable of giving a harmonic rotational oscillation of the outer plug, the device further including:

means to maintain an oscillation therein and means to change the mass moment of inertia of the outer plug so as to increase or decrease its resonant frequency.

2. A torsional vibrator as claimed in claim 1, said reeds being at least two sets of reeds in the form of flat leaf springs, the reeds of each set lying in a common plane which plane also includes the imaginary central axis.

3. A torsional vibrator as claimed in claim 2, having two sets of reeds, the planes of two sets being perpendicular to each other.

4. A torsional vibrator as claimed in claim 1, said plugs being circular, said reeds mounted radially with their outer edges adjoining the outer circumferences of said plugs, and perpendicularly to the said plugs.

5. A torsional vibrator as claimed in claim 4, said reeds being at least two pairs of reeds, the reeds of each pair being mounted opposite from each other in a common plane, the radius of said plugs being greater than the width of said reeds.

6. A torsional vibrator as claimed in claim 1, further comprising:

a mounting plate, said inner plug mounted to said mounting plate;

a two-arm shutter and an adjustable number of tuning discs attached to said outer plug;

a permanent magnet attached to one arm of said shutter;

a pickup coil mounted adjacent said magnet on said mounting plate;

a driving coil also mounted adjacent to said magnet on said mounting plate, and an amplifier circuit connecting said pickup coil with said driving coil.

7. An electromechanical torsional oscillator device for the mechanical modulation of an apparatus measuring the frequency of electromagnetic radiations, operating independently of its position and automatically excitable, comprising in combination:

a mechanical torsional vibrator having an inner stationary cylindrical plug and an outer oscillatable cylindrical plug spaced from the former along a common central imaginary axis perpendicular to said plugs to form an elongated cylindrical structure;

a plurality of oblong flat leaf springs symmetrically equidistantly spaced from each other with relation to said imaginary axis;

said leaf springs being connected with their respective opposite ends to both of said plugs, said leaf springs lying in planes crossing each other in said imaginary axis;

said leaf springs thus being devoid of vibrating properties in any direction other than around said axis;

a positionally fixed mounting plate;

said inner plug being mounted to said mounting plate;

a mounting sleeve mounted to the outside of said outer plug;

a shielding shutter having one long shutter arm and an opposite short arm dynamically balanced with the former, said shutter having a central bore wherein it is attached to said sleeve;

an adjustable number of inertia tuning discs with a central orifice for mounting on said sleeve;

a permanent magnet affixed to said short arm of said shutter for movement therewith;

a pickup coil fixedly mounted on said mounting plate adjacent one side of said magnet to pick up the movement of said magnet, thereby exciting an induced voltage therein;

an amplifier for the pickup coil output;

a driving coil fixedly mounted on said mounting plate adjacent to said magnet on the side opposite from that of said pickup coil;

circuit connections between said pickup coil, amplifier and said driving coil;

whereby said driving coil pushes said magnet in response to the pickup coil output, thus causing said magnet to move in response to the slightest initial displacement, thereby swinging said shutter out of its zero position, whereby the combined mass moment of inertia of said outer plug, said shutter and magnet, and of said inertia discs determines the frequency of oscillation of the shutter, given a certain overall spring constant of said leaf springs.

8. A mechanical-electrical oscillator as claimed in claim 7, said plurality of leaf springs being two pairs of leaf springs, the leaf spring of each pair being mounted radially in opposition to each other in a common plane, the planes of the two pairs of leaf springs being perpendicular to each other, the radius of said plugs being greater than the width of said leaf springs.

9. A mechanical-electrical oscillator as claimed in claim 7, said plurality of leaf springs being two leaf springs axially mounted perpendicularly to each other, the length of each leaf spring being about equal to the diameter of said plugs.